United States Patent [19]
Deml et al.

[11] Patent Number: 6,059,379
[45] Date of Patent: May 9, 2000

[54] BRAKE SYSTEM FOR A MOTOR VEHICLE

[75] Inventors: Ulrich Deml, Lappersdorf; Thomas Brandmeier, Regensburg, both of Germany

[73] Assignee: Siemens Aktiengesellschaft, Munich, Germany

[21] Appl. No.: 08/938,908

[22] Filed: Sep. 26, 1997

[30] Foreign Application Priority Data

Sep. 26, 1996 [DE] Germany .......................... 196 39 686

[51] Int. Cl.$^7$ ...................................................... B60T 7/00
[52] U.S. Cl. .................................. 303/15; 303/3; 303/20; 303/191; 188/1.11 E
[58] Field of Search .............................. 303/3, 15, 6.01, 303/20, 191, DIG. 2, DIG. 3, DIG. 4; 188/1.11 E, 72.1

[56] References Cited

U.S. PATENT DOCUMENTS

| | | | |
|---|---|---|---|
| 4,623,044 | 11/1986 | Ohta et al. | 188/72.1 |
| 5,279,394 | 1/1994 | Wollenweber et al. | 188/1.11 E |
| 5,645,143 | 7/1997 | Mohr et al. | 303/15 |

FOREIGN PATENT DOCUMENTS

| | | |
|---|---|---|
| 1260324 | 2/1968 | Germany . |
| 1927282 | 12/1970 | Germany . |
| 2954162C2 | 6/1987 | Germany . |

*Primary Examiner*—Robert J. Oberleitner
*Assistant Examiner*—Mariano Sy
*Attorney, Agent, or Firm*—Herbert L. Lerner; Laurence A. Greenberg

[57] ABSTRACT

The brake system of a motor vehicle has a wheel-brake actuator for each wheel brake. The wheel-brake actuator, which is controlled by the brake pedal via electric lines, presses the brake linings against the brake disk. A force sensor senses the circumferential force produced by the brake torque. The output signal of the sensor is taken into account as the current value by the control of the wheel-brake actuator when setting the contact force between the brake linings and the brake disk.

6 Claims, 2 Drawing Sheets

BRAKE SYSTEM FOR A MOTOR VEHICLE

BACKGROUND OF THE INVENTION

1. Field of the Invention

The invention pertains to a brake system for a motor vehicle with an actuating device for the individual wheel brakes controlled by the brake pedal; the actuating device, which is connected to the brake pedal through electric lines and which causes brake linings to press against the respective brake disk, is an electromechanical wheel-brake actuator which is mounted on a mount for a brake caliper of the respective wheel brake. The system further includes a sensor disposed at the wheel brake which produces a signal that serves to control the wheel-brake actuator.

2. Description of the Related Art

In conventional motor vehicles, the braking force is controlled by the force exerted by the driver on the brake pedal. Braking interventions by anti-blocking or anti-lock devices, drive-stability control systems, drive-slip control or traction control and the like may be superimposed on this control. This is realized in conventional brake systems (see, for instance, German Patent DE-C 29 54 162) with hydraulic pumps and solenoid valves. In that case, however, the effect of the brake pressure on the braking operation cannot be accurately detected, since the brake-lining/brake-disk and tire/road coefficients of friction are not accurately known. The maximum braking force (adhesion limit) to be absorbed by a tire depends on the state of the tire and in particular on the state of the roadway; it varies within wide limits on a dry or wet roadway surface, in snow, on ice, etc. Since the maximum braking force is not known, the prior art anti-lock systems detect the adhesion limit via an evaluation of the wheel rotary speeds. The evaluation of the wheel rotary speeds and the determination of the adhesion limit is rather time-consuming.

In a published electromechanical vehicle brake (Automobil-technische Zeitschrift, 1996, No. 6, pp. 328–333), the driver's intention is passed via the brake pedal to a master computer which is responsible for the brake management of the entire vehicle. The master computer transmits the driver's intention to the individual brake modules, which set a required wheel braking torque for each individual wheel. Each wheel brake has a brushless electric motor which presses the brake lining against a brake disk via a spindle and is held on the caliper of the disk brake. A spindle nut is driven directly by the rotor of the electric motor. A rotary-position transducer (resolver) supplies an actual value for the engine governing and is used at the same time for the electrical commutation.

A prior art method of controlling the braking effect of hydraulically actuated brakes on aircraft landing wheels utilizes the wheel slip in order to control the braking force. The wheel slip is determined from the rotary speeds of a braked and an unbraked wheel (see German patent publication DE 12 60 324 B). The brake is released after a limit value of the slip is exceeded. In addition, the wheel load, as normal force, and the braking torque (brake moment) are measured, and then the wheel slip, the slip change per unit of time, the braking coefficient, the braking-coefficient change per unit of time, and the ratio of the braking-coefficient change to the slip change are calculated from the above-mentioned variables with the aid of an entire series of computers. The braking torque, which is detected with a torque sensor, enters with many other variables into a very complicated calculation of the ratio of the braking-coefficient change to the slip change, and it is this ratio alone which serves as the actual value for the brake control.

A prior art sensor for braking-force distribution systems and/or anti-lock systems for motor vehicles (German published patent application DE 19 27 282 A) detects the deceleration of the motor vehicle by measuring the stresses or extensions in a part stressed by deceleration forces, for example in the brake caliper of a disk brake or at the fixing point of the brake caliper, specifically with wire strain gauges attached there. Accurate measurement of the elastic extension enables the acting force and thus the deceleration to be deduced. The sensor produces an (actual-value) signal which is a measure of the deceleration of the motor vehicle.

A brake system for a motor vehicle of interest is described in a commonly owned copending application Ser. No. 08/899,748 (filed Jul. 24, 1997). That brake system has an actuating device for the individual wheel brakes which is controlled by the brake pedal via electric lines. The actuating device is designed as an electromechanical wheel-brake actuator which is mounted on the brake caliper of each wheel and by means of which the brake linings are pressed against the respective brake disk.

SUMMARY OF THE INVENTION

It is accordingly an object of the invention to provide a TITLE, which overcomes the above-mentioned disadvantages of the heretofore-known devices and methods of this general type and which enables a direct measurement of the braking force.

With the foregoing and other objects in view there is provided, in accordance with the invention, a brake system for a motor vehicle with a plurality of wheels and a driver-actuated brake pedal, comprising:

a plurality of individual wheel brakes each for braking a wheel of a motor vehicle, each of the wheel brakes including a brake caliper and brake linings pressing against respective brake disks with a defined contact force for braking the wheels of the motor vehicle;

an electromechanical wheel-brake actuator connected to each of the wheel brakes, the wheel brake actuator being controlled by a brake pedal of the motor vehicle via electric lines;

a force sensor disposed at each of the wheel brakes for directly measuring a circumferential force produced by a brake torque and outputting an output signal; and a control device connected to and controlling the wheel-brake actuators, the control device receiving the output signal of the force sensor and taking the output signal into account for setting the contact force of the brake linings.

In accordance with an added feature of the invention, there is provided a mount at each of the wheels of the motor vehicle, the wheel-brake actuator and the caliper of each of the wheel brakes being commonly mounted on the mount.

In accordance with an additional feature of the invention, the sensor is mounted at the brake caliper.

In accordance with another feature of the invention, the brake caliper is connected to the mount with a fastening screw or bolt and the force sensor is disposed on the fastening screw.

In accordance with a further feature of the invention, the brake caliper is connected to the mount with two fastening screws and the force sensor includes one force sensor disposed on each of the fastening screws, the fastening screws and the force sensors being arranged behind one another in a circumferential direction of the brake disk, such that a first one of the two force sensors is stressed in tension and a second one of the force sensors is stressed in compression during braking.

In accordance with again a further feature of the invention, the braking force instantaneously exerted on a roadway by the wheel is determined from a difference between the output signals of the two force sensors.

In accordance with a concomitant feature of the invention, the contact force instantaneously exerted on the brake disk by the wheel-brake actuator is determined from a sum of the output signals of the two force sensors.

In summary, the advantages of the invention lie in particular in the fact that the direct measurement of the braking force means that this information is available very quickly and can be evaluated correspondingly quickly in the brake control devices. The braking distance is thus shortened. In addition, due to different coefficients of friction between the brake linings and the brake disk, which, for example, may stem from spray water or from different temperatures of the brake disks, a yaw moment which turns the vehicle out of a direction of travel is produced in the case of conventional hydraulic brake systems. This appears owing to the fact that, although the braking pressures are equal, the braking forces at the individual wheels differ from one another on account of the different coefficients of friction. Such effects can be effectively compensated for by the direct measurement of the braking force.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
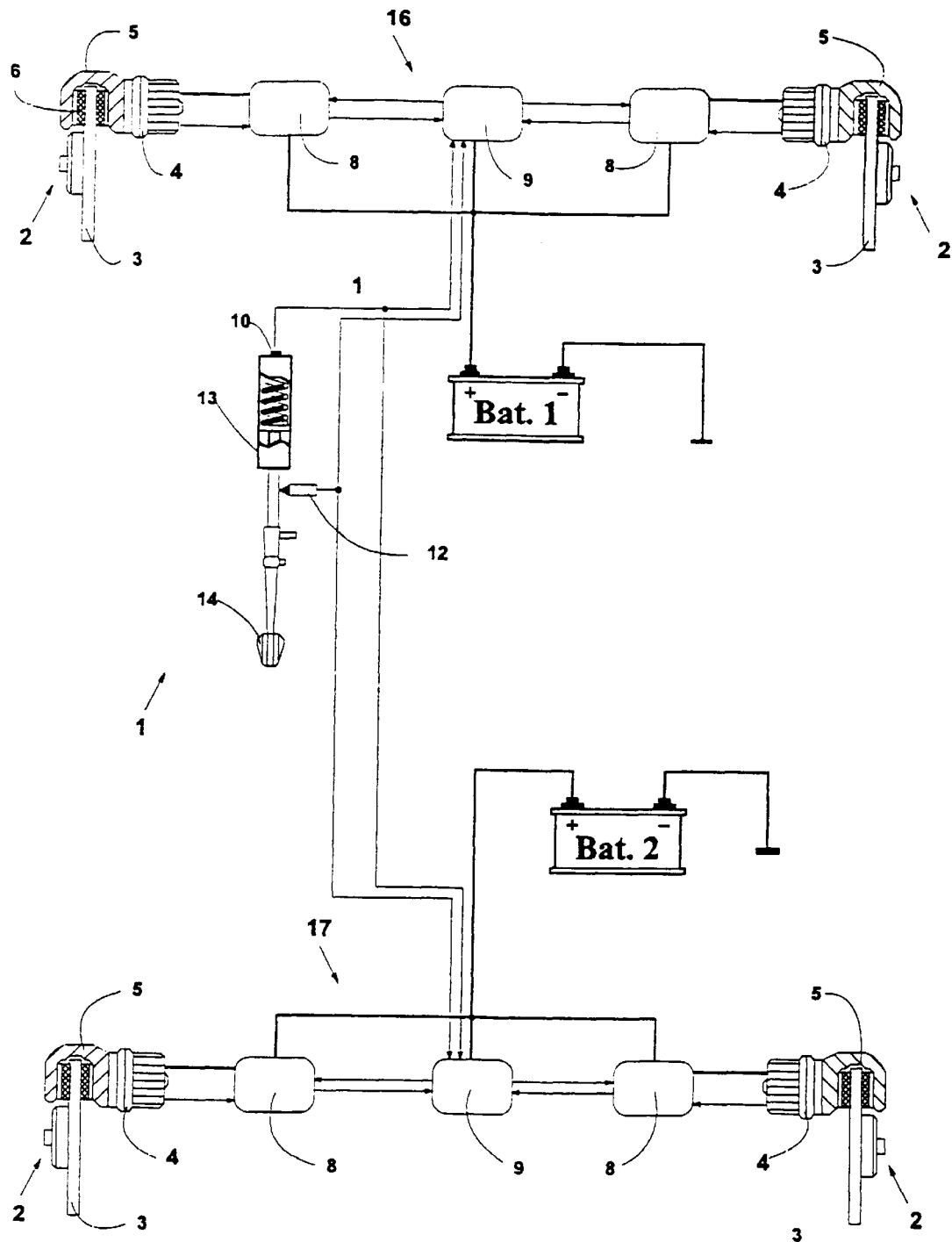
FIG. 1 is a schematic diagrammatic illustration of a brake system according to the invention.

Referring now to the figures of the drawing in detail and first, particularly, to FIG. 1 thereof, there is seen a brake system 1 for a motor vehicle with four wheels (the motor vehicle is not shown in detail for reasons of clarity). The wheels are braked by four brakes 2, which each include a brake disk 3 and an actuating device in the form of a wheel-brake actuator 4. Each wheel-brake actuator 4 is integrated in an associated brake caliper 5, i.e., it is combined with the latter to form a structural unit. The brake caliper 5 is a floating caliper. A braking torque is exerted on the brake disk 3 via brake linings 6 when the wheel-brake actuator 4 is actuated.

Each wheel-brake actuator 4 has an electronic power and control unit 8 which is supplied with control signals, for example for the desired force or pressure to be applied by the wheel-brake actuator 4, from an associated control device 9, and delivers feedback variables, for example relating to the actual value of the force, to the control device 9.

The electronic power and control unit 8 likewise receives from the wheel-brake actuator 4 feedback variables, for example relating to the contact force with which the brake linings 6 are pressed against the brake disk 3 by the brake actuator 4. The desired variables for each wheel-brake actuator are determined by the control device 9 from measured variables which are delivered by various sensors. Such sensors include a force sensor 10 and a displacement sensor 12, which are each integrated with a pedal-force simulator 13 actuated by the brake pedal 14 of the motor vehicle. The pedal-force simulator 13 converts the motion of the brake pedal 14, i.e. the force exerted as usual by the driver and the pedal travel, into electrical signals which are fed to the control device 9. These signals thus represent desired values for the brakes 2, in particular for the vehicle deceleration and the torque or brake torque to be applied to the brake disks. To calculate the desired values in the event of intervention of anti-lock or drive-stability control systems, further sensor signals, for example the transverse acceleration or the yaw angular velocity and the wheel rotary speed, can be evaluated by the control device 9.

The brake system of FIG. 1 has two brake circuits 16 and 17, which are respectively assigned to the front axle and the rear axle. A diagonal assignment of the brake circuits, which is equally possible, differs herefrom only by the wheel-brake units being allocated differently to the control devices and power supplies. Each brake circuit 16, 17 has a separate control device 9 and a separate power supply in the form of a battery Bat.1 or Bat.2 respectively. The energy supplies and the control devices may be accommodated in a common housing in each case, but must then be functionally separate from one another.

In FIG. 1, supply lines are depicted as thick lines and are not provided with arrows; control and signal lines are depicted as thin lines and are provided with arrows in accordance with the signal-flow direction.

The two control devices 9, which work independently of one another, can communicate with one another via a bidirectional signal line and can thereby recognize the failure of a brake circuit 16 or 17 in the respectively other brake circuit. If need be, each brake circuit may take suitable measures. The brake system may also be supplemented by a non-illustrated third control device which, as supervisor, monitors the two brake-circuit control devices.

Figure 2:
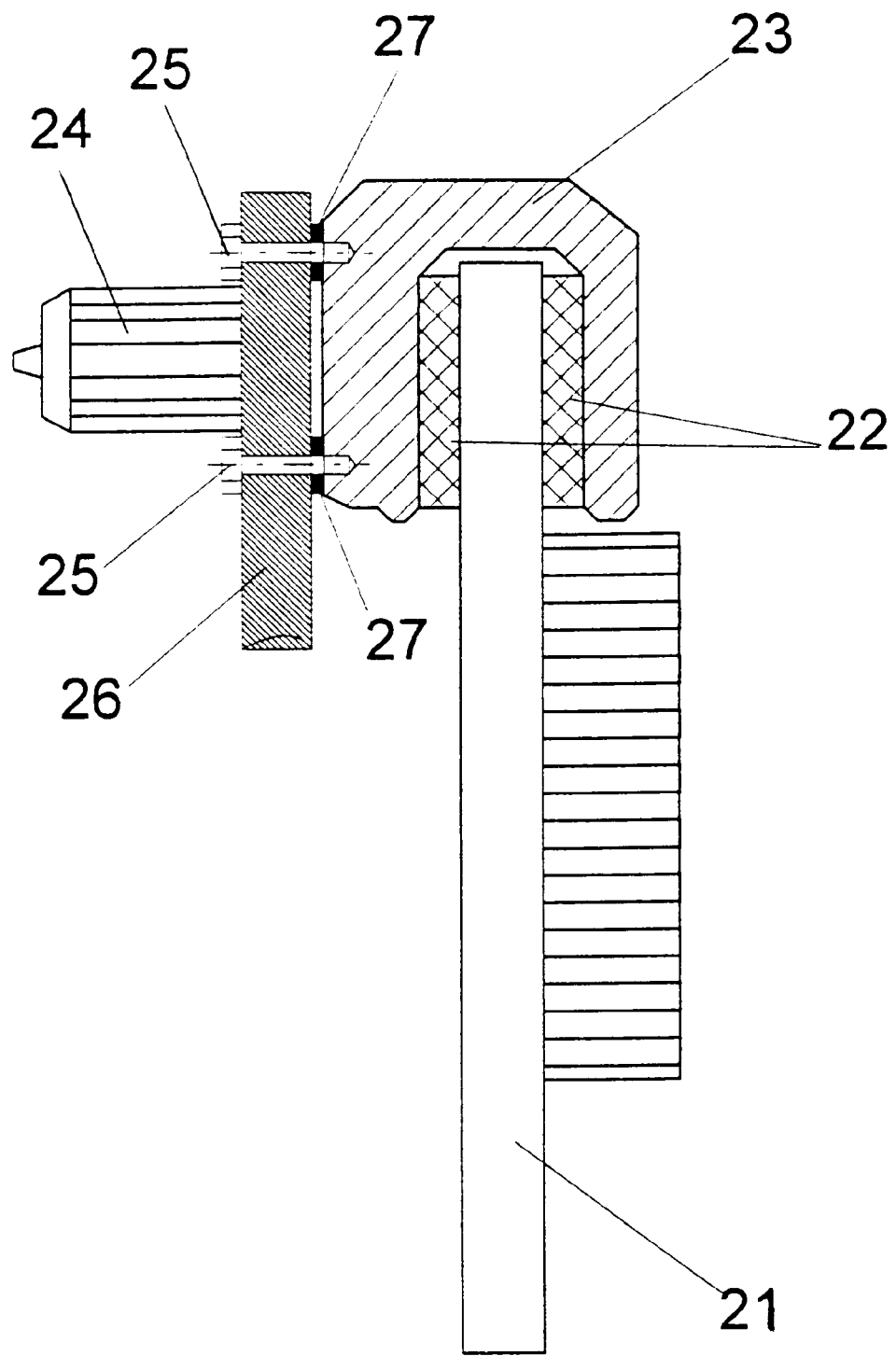
FIG. 2 is an enlarged view, relative to FIG. 1, of a single wheel brake of the novel brake system.

Referring now more specifically to FIG. 2, a brake disk 21 is braked by two brake pads or brake linings 22 disposed in a brake caliper 23. An electromagnetic brake actuator 24 presses the brake linings 22 against the brake disk 21 during braking. The brake caliper 23 is fastened to a mounting bracket or mount 26 by fastening screws 25.

The brake caliper 23 is only shown schematically here, since such brake calipers are known. The caliper 23 illustrated is a floating caliper and is displaceably mounted in a fixed part. A piston or another actuating element of the wheel-brake actuator 24 presses the left-hand brake lining 22 against the brake disk 21. The reaction force occurring in the process displaces the brake caliper 23 against the frame and the latter pulls the right-hand brake lining 22 against the brake disk 21.

A force sensor 27 is disposed on each of the fastening screws 25. The sensors each measure the force acting on the respective fastening screw and transmit a corresponding signal to the control device 9 (FIG. 1) via signal lines.

In the drawing, the arrangement of the two fastening screws 25 and of the force sensors 27 is shown rotated through 90° into the drawing plane for the sake of clarity. In reality, the two screws and sensors are arranged one behind the other in the circumferential direction of the brake disk, i.e. at right angles to the drawing plane.

A reaction force is produced in the fastening screws 25 due to the adhesion between the roadway and the tire of the motor vehicle, which reaction force corresponds exactly to the braking force at the tire. Due to the lever arm between the force-application point on the brake linings 22 and the fastening screws 25, one of the two fastening screws is stressed in tension and the other in compression. These forces are detected by the two force sensors 27. The two fastening screws 25 are prestressed, and the force sensors 27 measure a force even in the state of rest. The difference between the forces which stress the two fastening screws 25 during braking and which are transmitted from the force sensors 27 to the control unit is a measure of the instantaneous braking force of the tire, and the sum of these two measured forces is a measure of the contact force of the brake actuator 24.

The signals from the force sensors 27 are subtracted or added in the control device and—if necessary by taking into consideration the geometry of the brake using constant factors—directly result in the desired braking forces.

We claim:

1. A brake system for a motor vehicle with a plurality of wheels and a driver-actuated brake pedal, comprising:

a plurality of individual wheel brakes each for braking a wheel of a motor vehicle, each of said wheel brakes including a brake caliper and brake linings pressing against respective brake disks with a defined contact force for braking the wheels of the motor vehicle;

an electromechanical wheel-brake actuator connected to each of said wheel brakes, said wheel brake actuator being controlled by a brake pedal of the motor vehicle via electric lines;

a force sensor disposed at each of said wheel brakes for directly measuring a circumferential force produced by a brake torque and outputting an output signal;

a control device connected to and controlling said wheel-brake actuators, said control device receiving the output signal of said force sensor and taking the output signal into account for setting the contact force of said brake linings; and a mount at each wheel of the motor vehicle, said wheel-brake actuator and said brake caliper of each of said wheel brakes being commonly mounted on said mount.

2. The brake system according to claim 1, wherein said sensor is mounted at said brake caliper.

3. The brake system according to claim 1, wherein said brake caliper is connected to said mount with a fastening screw and said force sensor is disposed on said fastening screw.

4. The brake system according to claim 1, wherein said brake caliper is connected to said mount with two fastening screws and said force sensor includes one force sensor disposed on each of said fastening screws, said fastening screws and said force sensors being arranged behind one another in a circumferential direction of the brake disk, such that a first one of said two force sensors is stressed in tension and a second one of said force sensors is stressed in compression during braking.

5. The brake system according to claim 4, wherein the braking force instantaneously exerted on a roadway by the wheel is determined from a difference between the output signals of said two force sensors.

6. The brake system as claimed in claim 4, wherein the contact force instantaneously exerted on the brake disk by said wheel-brake actuator is determined from a sum of the output signals of said two force sensors.

* * * * *